(12) United States Patent
Gu

(10) Patent No.: US 11,142,282 B2
(45) Date of Patent: Oct. 12, 2021

(54) BICYCLE SHOE CLEAT FOR CLIPLESS PEDALS

(71) Applicant: Haidong Gu, Pomona, CA (US)

(72) Inventor: Haidong Gu, Pomona, CA (US)

(73) Assignee: CYCLINGDEAL USA, INC., Pomona, CA (US)

( * ) Notice: Subject to any disclaimer, the term of this patent is extended or adjusted under 35 U.S.C. 154(b) by 60 days.

(21) Appl. No.: 16/698,957

(22) Filed: Nov. 28, 2019

(65) Prior Publication Data

US 2021/0163096 A1 Jun. 3, 2021

(51) Int. Cl.
*B62M 3/08* (2006.01)

(52) U.S. Cl.
CPC .................. *B62M 3/086* (2013.01)

(58) Field of Classification Search
CPC ........ B62M 3/086; B62M 3/083; B62M 3/08; A43B 5/14; A43B 5/18; Y10T 74/217; Y10T 74/2168
See application file for complete search history.

(56) References Cited

U.S. PATENT DOCUMENTS

| 4,936,164 | A | * | 6/1990 | Forke | B62M 3/086 36/131 |
| 5,081,883 | A | * | 1/1992 | Romano | B62M 3/086 36/131 |
| 5,199,192 | A | * | 4/1993 | Kilgore | A43B 5/14 36/131 |
| 5,213,009 | A | * | 5/1993 | Bryne | B62M 3/086 74/594.4 |
| 5,724,752 | A | * | 3/1998 | Lin | A43B 5/14 36/131 |
| 5,860,330 | A | * | 1/1999 | Code | B62M 3/086 74/594.6 |
| 6,244,136 | B1 | * | 6/2001 | Chen | A43B 5/14 36/131 |
| 7,219,451 | B2 | * | 5/2007 | Chretien | A43B 5/14 36/131 |
| 9,254,016 | B2 | * | 2/2016 | Tews | A43B 3/24 |
| 9,511,817 | B2 | * | 12/2016 | Bryne | B62M 3/086 |
| 2005/0188567 | A1 | * | 9/2005 | Chretien | A43B 5/14 36/131 |
| 2006/0016102 | A1 | * | 1/2006 | Xie | A43B 5/14 36/131 |
| 2012/0047772 | A1 | * | 3/2012 | Lin | A43B 5/14 36/134 |

* cited by examiner

*Primary Examiner* — Daniel D Yabut

(57) ABSTRACT

A bicycle shoe cleat includes a first slot defined through a front portion of the bicycle shoe cleat, and two second slots defined through a rear portion of the bicycle shoe cleat. Bolts extend the first and second slots, and are connected to the outsole of a racing bicycle shoe. A protrusion extends from one of two surfaces of the rear portion and has a convex and curved outer surface. A stepped portion is formed between the protrusion and the rear portion. Two bores are defined through the protrusion and the bicycle shoe cleat. Two fixing bolts extend through an engaging member and are connected to the two bores. The bicycle shoe cleat and the engaging member are installed to a racing bicycle shoe and can be clipped to clipless pedals of mounting bikes.

4 Claims, 6 Drawing Sheets

BICYCLE SHOE CLEAT FOR CLIPLESS PEDALS

BACKGROUND OF THE INVENTION

1. Fields of the Invention

The present invention relates to a bicycle shoe cleat installed to a racing shoe and the cleat is able to be clipped to clipless pedals of mounting bikes.

2. Descriptions of Related Art

The bicycles include racing bicycles and mountain bicycles, wherein the racking bicycles are equipped with a specific type of clipless pedals, and the mountain bicycles are equipped with another specific type of clipless pedals. The proper clipless pedals allow the riders to engage their bicycles shoes with the clipless pedals quickly so as to correctly and smoothly tread the pedals and to prevent from being injured due to wrong treading poses. The bicycle shoes includes an engaging member which is removably engaged with the shoes, and the clipless pedals have a correspondent mechanism so as to be engaged with the engaging member. For example, the shoes for mountain bicycles require to have anti-slip feature. On the contrary, for the shoes for racing bicycles, the treading efficiency is the main concern. Generally, the outsole of the bicycle shoes have a stiff outsole.

Most of the users have shoes for both the mountain bicycles and the racing bicycles. However, the shoes for the pedals of racing bicycles cannot be used to the pedals of mountain bicycles, and vice versa. In other words, the users have to purchase two different bicycle shoes.

The present invention is intended to provide a cleat which can be connected to the racing shoes so as to use the pedals of mountain bicycles.

SUMMARY OF THE INVENTION

The present invention relates to a bicycle shoe cleat and comprises a first surface and a second surface which is located opposite to the first surface. The first surface is to be connected to a racing bicycle shoe, and the second surface is connected to an engaging member which is to be connected with a mountain bicycle pedal.

The bicycle shoe cleat has a front portion and a rear portion which is wider than the front portion. A first slot is defined through the first and second surfaces of the front portion. Two second slots are defined through the first and second surfaces of the rear portion. The axis of the first slot and the two respect axes of the two second slots are parallel to each other. A first bolt extends through the first slot and to be connected to the outsole of the racing bicycle shoe. Two second bolts extend through the two second slots and are to be connected to the outsole of the racing bicycle shoe.

A protrusion extends from the second surface of the rear portion and has a convex and curved outer surface. A stepped portion is formed between the protrusion and the second surface of the rear portion. Two bores are defined through the protrusion and the first surface of the bicycle shoe cleat. Two fixing bolts extend through the engaging member and are connected to the two bores.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
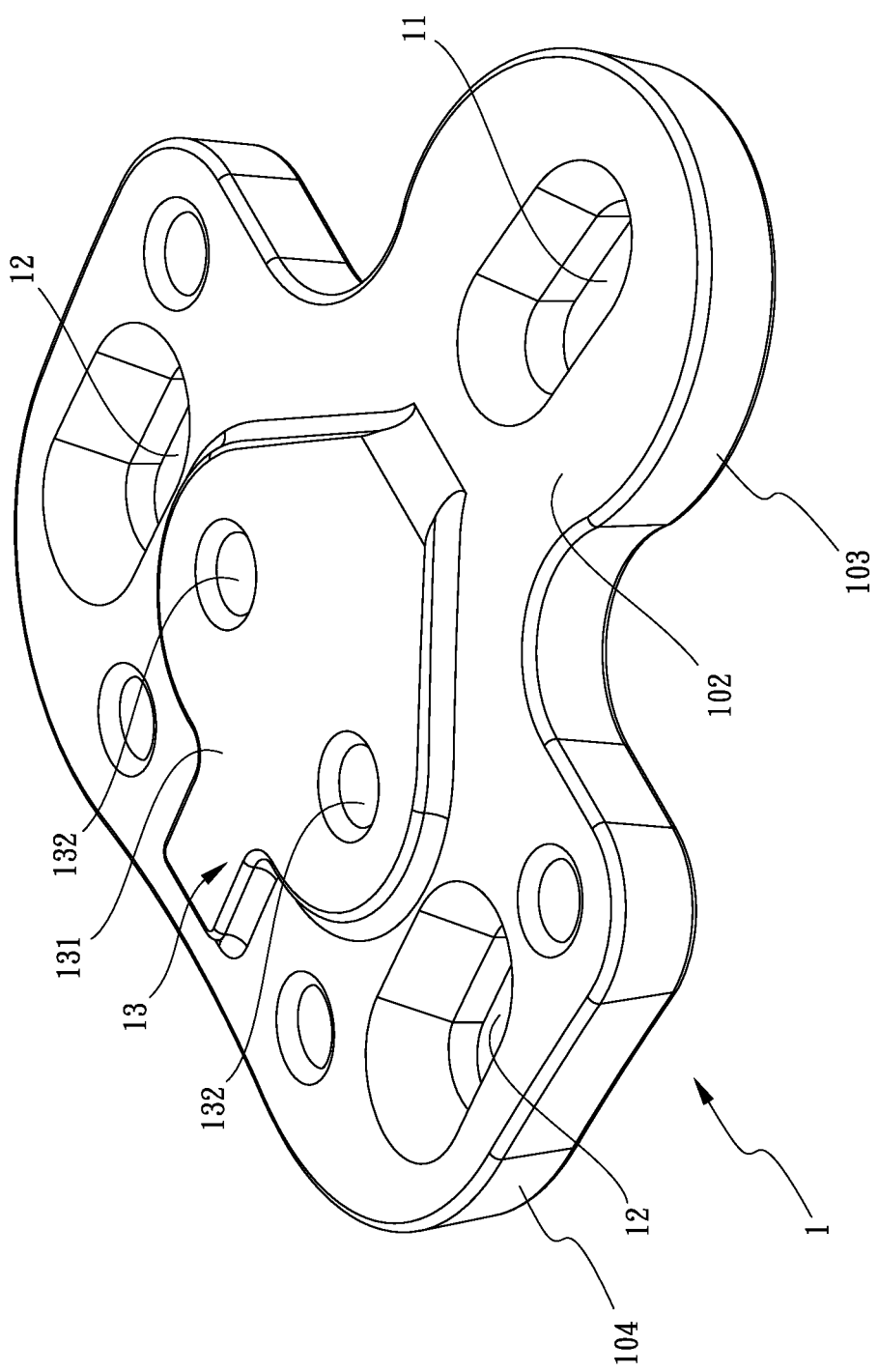
FIG. 1 is a perspective view to show the bicycle shoe cleat of the present invention.
Figure 2:
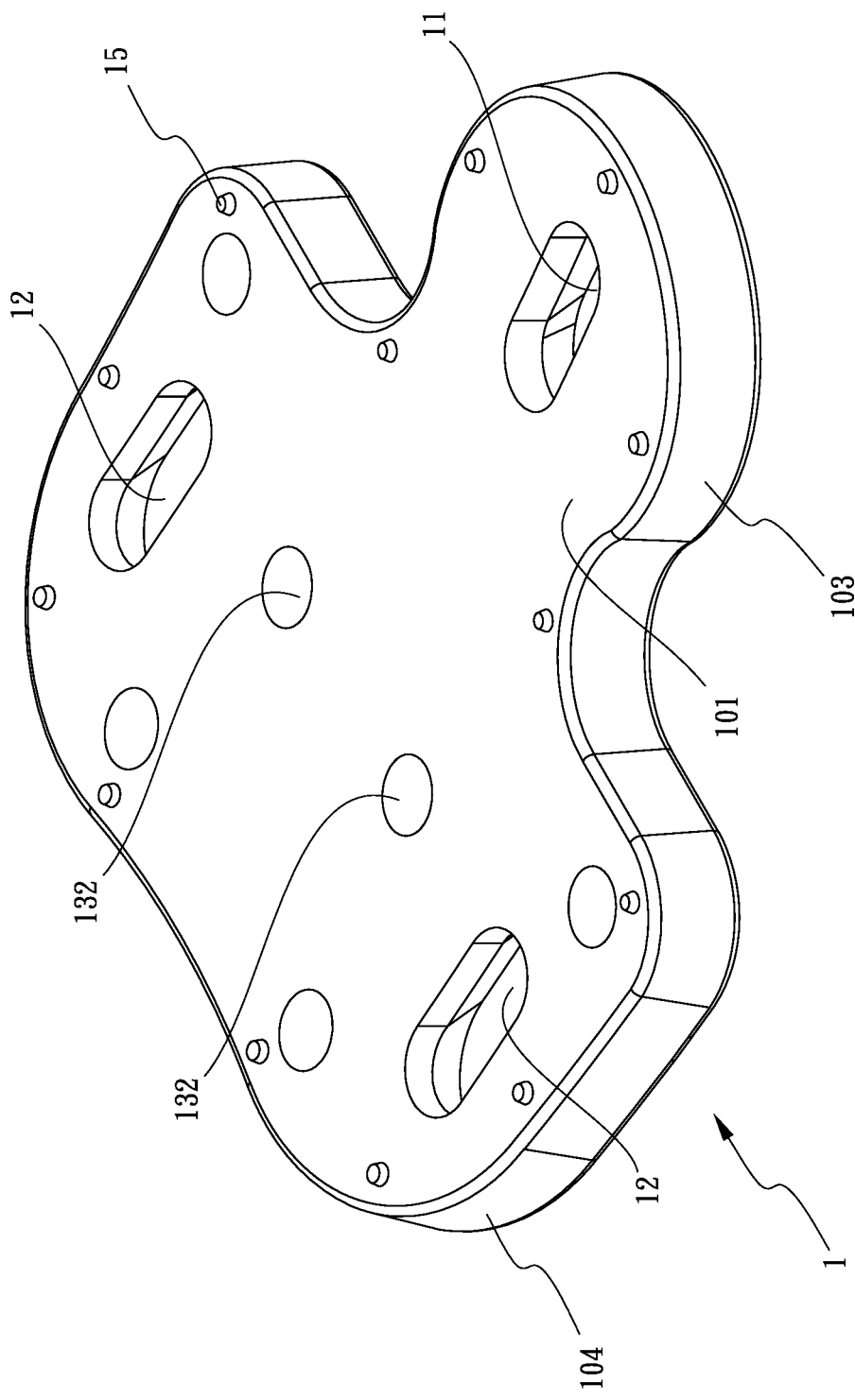
FIG. 2 is another perspective view to show the bicycle shoe cleat of the present invention.
Figure 3:
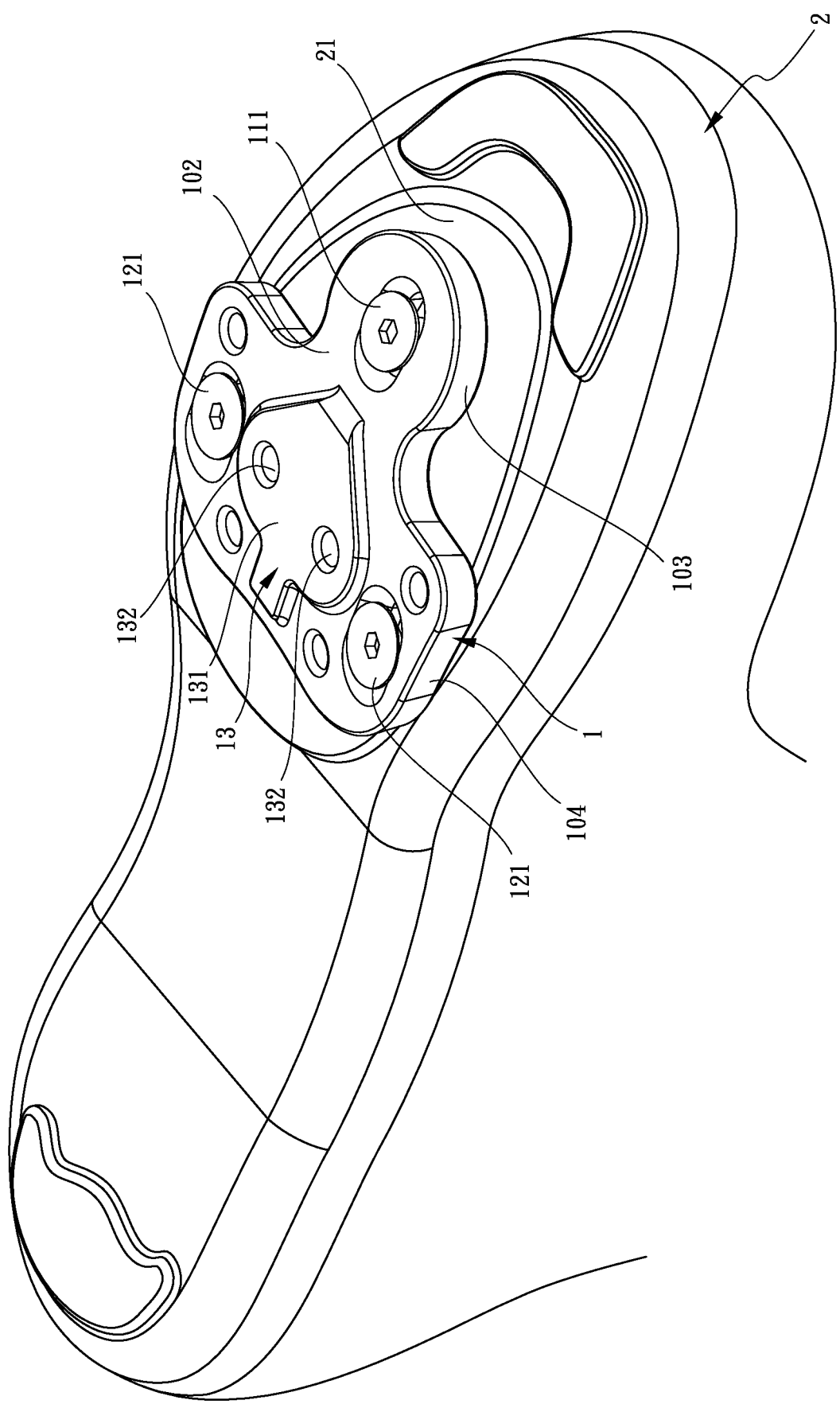
FIG. 3 shows that the bicycle shoe cleat of the present invention is connected to a bicycle shoe.
Figure 4:
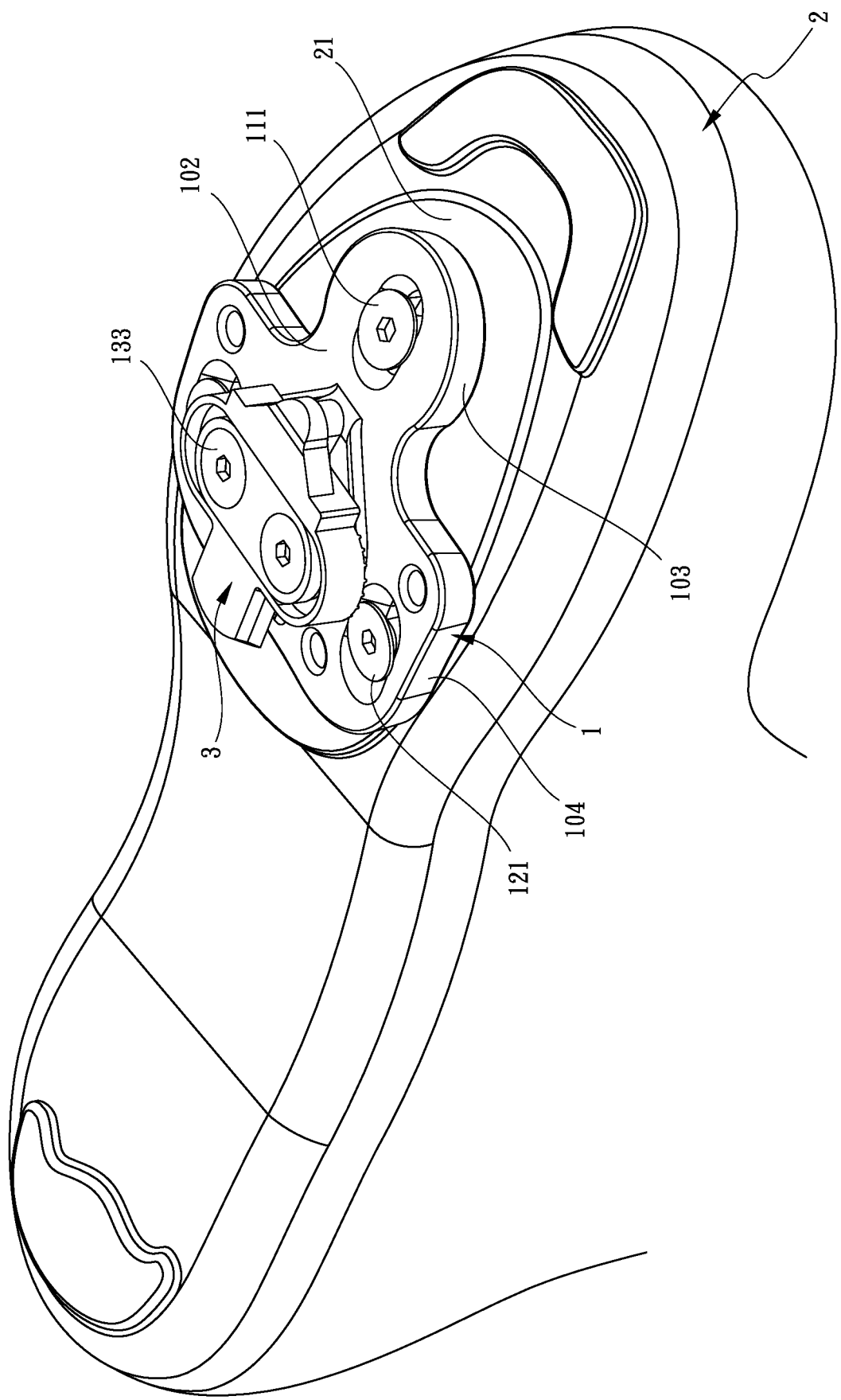
FIG. 4 shows that an engaging member is connected to the bicycle shoe cleat of the present invention.
Figure 5:
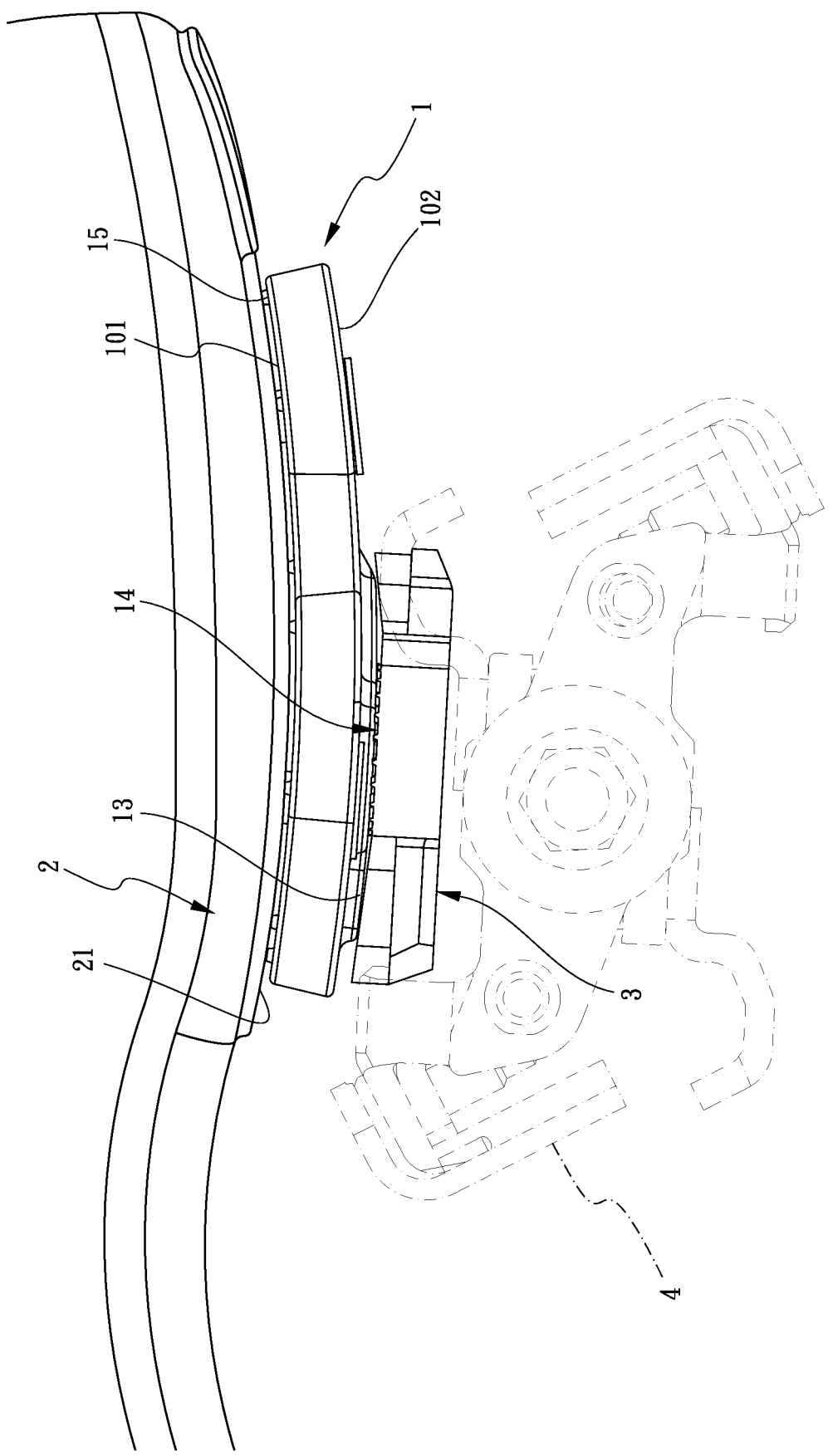
FIG. 5 shows that the engaging member on the bicycle shoe cleat of the present invention is engaged with a bicycle pedal.

Referring to FIGS. 1 to 5, the bicycle shoe cleat 1 of the present invention comprises a first surface 101 and a second surface 102 which is located opposite to the first surface 101. The first surface 101 is to be connected to a racing bicycle shoe 2. The second surface 102 is connected to an engaging, member 3 which is to be connected with a mountain bicycle pedal. The bicycle shoe cleat 1 has a front portion 103 and a rear portion 104 which is wider than the front portion 103. A first slot 11 is defined through the first and second surfaces 101, 102 of the front portion 103. Two second slots 12 are defined through the first and second surfaces 101, 102 of the rear portion 104. The axis of the first slot 11 and two respect axes of the two second slots 12 are parallel to each other. A first bolt 111 extends through the first slot 11 and is connected to the outsole 21 of the racing bicycle shoe 2. Two second bolts 121 extend through the two second slots 12 and are connected to the outsole 21 of the racing bicycle shoe 2. Therefore, the bicycle shoe cleat 1 is connected to the outsole 21 of the racing bicycle shoe 2. A protrusion 13 extends from the second surface 102 of the rear portion 104 and has a convex and curved outer surface 131. A stepped portion 14 is formed between the protrusion 13 and the second surface 102 of the rear portion 104. Two bores 132 are defined through the protrusion 13 and the first surface 101 of the bicycle shoe cleat 1. Two fixing bolts 133 extend through the engaging member 3 and are connected to the two bores 132. The first and second slots 11, 12 are elongate slots so that the bicycle shoe cleat 1 can be adjusted along the first and second slots 11, 12 relative to the racing bicycle shoe 2.

The bicycle shoe cleat 1 can be removed from the racing bicycle shoe 2 so that the users can use the racing bicycle shoes 2 to operate the normal pedals. The racing bicycle shoes 2 is connected to the bicycle shoe cleat 1 to operate the racing bicycle pedals. When the engaging member 3 is connected to the bicycle shoe cleat 1, the users can operate the mountain bicycle pedals without purchasing specific shoes for the mountain bicycle pedals.

The protrusion 13 is a club-shaped protrusion and includes the convex and curved outer surface 131. The first surface 101 and the second surface 102 each are a convex and curved surface as well. The treading force is supported on the convex and curved outer surface 131 of the protrusion 13. The stepped portion 14 prevent the engaging member 3 from contacting the second surface 102, so that when engaging the engaging member 3 with the mountain bicycle pedal 4, or removing the engaging member 3 with the mountain bicycle pedal 4, the engaging member 3 is not interfered.

There are multiple bosses 15 protrude from the first surface 101 and each boss 15 in this embodiment is a cone-shaped boss. These bosses 15 are located along a periphery of the bicycle shoe cleat 1 and contact against or slightly insert in the surface of the outsole 21 of the racing bicycle shoe 2 to enhance engagement between the bicycle shoe cleat 1 and the outsole 21. Therefore, when treading the pedals, the stress will be shared by the first bolt 111, the second bolts 121 and the contact between the bosses and the outsole 21.

Figure 6:
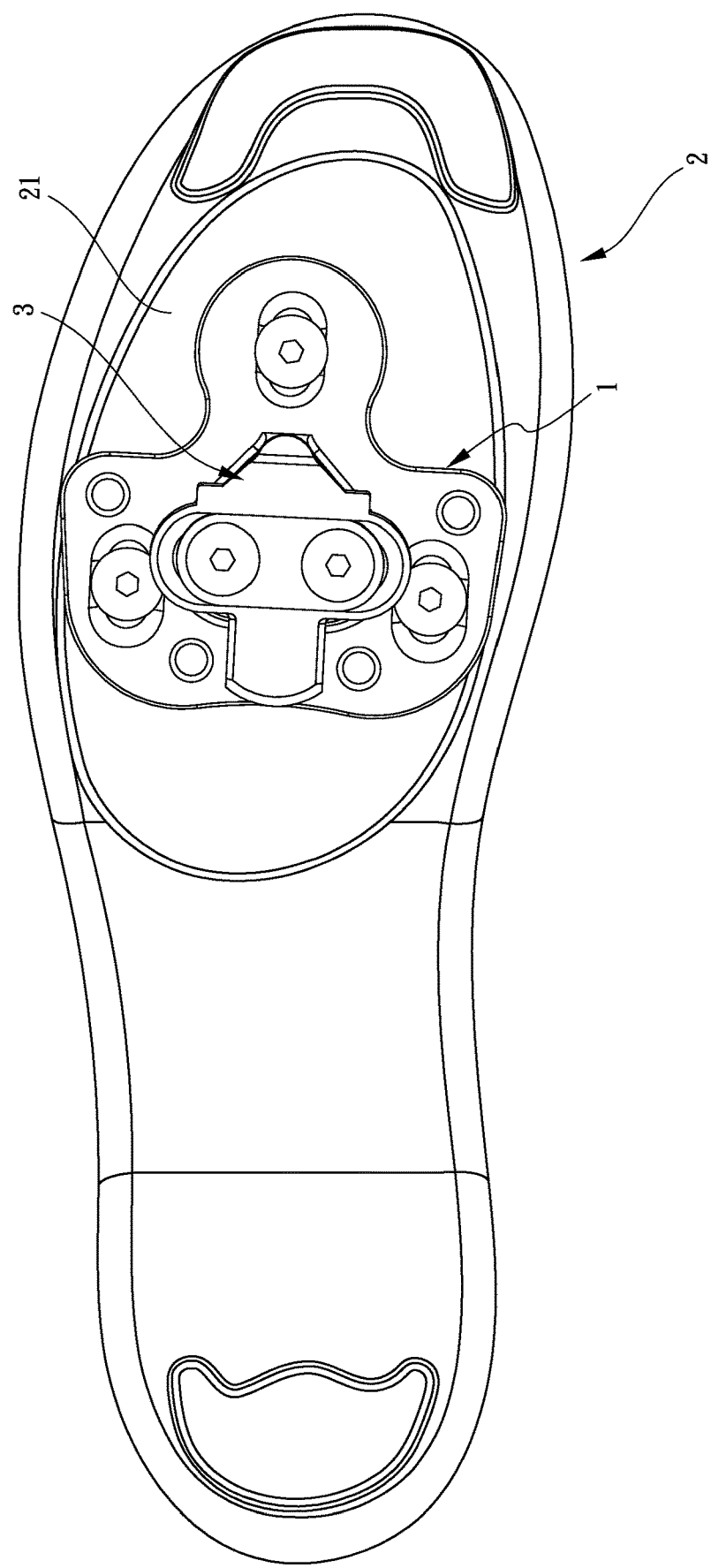
FIG. 6 is a bottom view to show that the engaging member is connected to the bicycle shoe cleat of the present invention.

As shown in FIG. 6, the width of the bicycle shoe cleat 1 is not wider than the width of the outsole 21 of the racing bicycle shoe 2.

While we have shown and described the embodiment in accordance with the present invention, it should be clear to those skilled in the art that further embodiments may be made without departing from the scope of the present invention.

What is claimed is:

1. A bicycle shoe cleat comprising:
   a first surface and a second surface which is located opposite to the first surface, the first surface adapted to be connected to a racing bicycle shoe, the second surface connected to an engaging member which is adapted to be connected with a mountain bicycle pedal, the bicycle shoe cleat having a front portion and a rear portion, a first slot defined through the first and second surfaces of the front portion, two second slots defined through the first and second surfaces of the rear portion, an axis of the first slot and two respect axes of the two second slots being parallel to each other, a first bolt extending through the first slot and adapted to be connected to an outsole of the racing bicycle shoe, two second bolts extending through the two second slots and adapted to be connected to the outsole of the racing bicycle shoe, the bicycle shoe cleat being removably connected to an underside of an outsole of the racing bicycle shoe, and
   a protrusion extending from the second surface of the rear portion and having a convex and curved outer surface, a stepped portion formed between the protrusion and the second surface of the rear portion, two bores defined through the protrusion and the first surface of the bicycle shoe cleat, two fixing bolts extending through the engaging member and connected to the two bores.

2. The bicycle shoe cleat as claimed in claim 1, wherein the first surface is a concave surface, and the second surface is a convex surface.

3. The bicycle shoe cleat as claimed in claim 1, wherein multiple bosses protrude from the first surface and are located along a periphery of the bicycle shoe cleat, the bosses are adapted to contact against the outsole of the racing bicycle shoe.

4. The bicycle shoe cleat as claimed in claim 1, wherein a width of the bicycle shoe cleat is not wider than a width of the outsole of the racing bicycle shoe.

\* \* \* \* \*